US008104176B2

(12) United States Patent
Takahashi et al.

(10) Patent No.: US 8,104,176 B2
(45) Date of Patent: Jan. 31, 2012

(54) METHOD OF MANUFACTURING A DEVELOPING AGENT REGULATING MEMBER FOR REGULATING AN AMOUNT OF A DEVELOPING AGENT

(75) Inventors: Yutaka Takahashi, Numazu (JP); Koichi Sakata, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 550 days.

(21) Appl. No.: 12/210,715

(22) Filed: Sep. 15, 2008

(65) Prior Publication Data

US 2009/0074473 A1 Mar. 19, 2009

(30) Foreign Application Priority Data

Sep. 19, 2007 (JP) ................................ 2007-241806

(51) Int. Cl.
*B21D 53/00* (2006.01)
*B21K 1/02* (2006.01)
*B23P 17/00* (2006.01)

(52) U.S. Cl. ..... 29/895.21; 29/592.1; 29/608; 29/524.1; 399/275; 451/5; 451/41

(58) Field of Classification Search ................. 29/592.1, 29/608, 895.21; 399/275; 451/5, 41
See application file for complete search history.

(56) References Cited

U.S. PATENT DOCUMENTS 5,025,343 A * 6/1991 Iida et al. ................. 360/125.01
6,887,636 B2 5/2005 Matsuda et al.
6,899,986 B2 5/2005 Aoki et al.
6,934,484 B2 8/2005 Suzuki et al.
6,977,030 B2 * 12/2005 Nanis ....................... 204/192.15
7,110,696 B2 9/2006 Murakami et al.
7,125,638 B2 10/2006 Suzuki et al.
7,149,465 B2 12/2006 Amemiya et al.
7,150,954 B2 12/2006 Aoki et al.
7,162,187 B2 1/2007 Koichi et al.
7,272,354 B2 9/2007 Murakami et al.
7,273,688 B2 9/2007 Suzuki et al.
7,315,723 B2 1/2008 Suda et al.
7,386,176 B2 6/2008 Oneda et al.
7,392,008 B2 6/2008 Takahashi
2005/0084271 A1 4/2005 Koike et al.
2005/0164108 A1 7/2005 Murakami et al.
2007/0036595 A1 2/2007 Amemiya et al.
2007/0059067 A1 3/2007 Tanaka et al.

(Continued)

FOREIGN PATENT DOCUMENTS

JP 2000-137381 5/2000

(Continued)

*Primary Examiner* — Paul D Kim
(74) *Attorney, Agent, or Firm* — Oblon, Spivak, McClelland, Maier & Neustadt, L.L.P.

(57) ABSTRACT

A method of manufacturing a developing agent regulating member is provided. The method includes providing a non-magnetic member and a magnetic member. The non-magnetic member and the magnetic member are fixed together by caulking such that an end face of the non-magnetic member and an end face of the magnetic member are substantially aligned with each other, and such that the non-magnetic member and the magnetic member are closely pressed together in order to reduce a gap between the non-magnetic member and the magnetic member. The end face of the non-magnetic member and the end face of the magnetic member are polished so as to prepare the regulating face of the developing agent regulating member by making the end face of the non-magnetic member and the end face of the magnetic member flush.

9 Claims, 8 Drawing Sheets

U.S. PATENT DOCUMENTS

| | | | |
|---|---|---|---|
| 2007/0122164 | A1 | 5/2007 | Shiori et al. |
| 2007/0122166 | A1 | 5/2007 | Takahashi et al. |
| 2007/0122167 | A1 | 5/2007 | Sugiyama et al. |
| 2007/0183824 | A1 | 8/2007 | Suda et al. |
| 2007/0286652 | A1 | 12/2007 | Suzuki et al. |
| 2008/0069597 | A1 | 3/2008 | Ishida et al. |
| 2008/0138094 | A1 | 6/2008 | Shiori et al. |

FOREIGN PATENT DOCUMENTS

| | | | | |
|---|---|---|---|---|
| JP | 2001356595 | A | * | 12/2001 |
| JP | 2004-191529 | | | 7/2004 |
| JP | 2004191529 | A | * | 7/2004 |

* cited by examiner

METHOD OF MANUFACTURING A DEVELOPING AGENT REGULATING MEMBER FOR REGULATING AN AMOUNT OF A DEVELOPING AGENT

CROSS-REFERENCE TO RELATED APPLICATIONS

This application claims priority under 35 U.S.C. §119(a) to Japanese Patent Application No. 2007-241806, filed on Sep. 19, 2007 in the Japan Patent Office, the entire contents of which are hereby incorporated by reference herein.

BACKGROUND OF THE INVENTION

1. Field of the Invention

The present disclosure generally relates to a developing agent regulating member, a development unit and an image forming apparatus employing a developing agent regulating member, and a method of manufacturing a developing agent regulating member.

2. Description of the Background Art

In general, an image forming apparatus employing electrophotography includes a development unit for developing a latent image as a visible image, such as, for example, a toner image. The development unit includes a developing agent carrying member having a magnetic field generator such as, for example, a magnet provided therein, and a developing agent regulating member. The developing agent carrying member carries a given amount of developing agent on its surface using magnetic force of magnetic field, and the developing agent regulating member regulates a layer thickness of developing agent (hereinafter, agent layer) on the developing agent carrying member before the developing agent is transported to a developing area. Hereinafter, the developing agent regulating member may be referred to as a regulating member, and the developing agent carrying member may be referred to as an agent carrying member for the simplicity of expression.

Recently, an amount of developing agent transported to the developing area has been set to a smaller amount. Thus, an agent layer on the agent carrying member is set to be thinner by a regulating member.

The regulating member and the agent carrying member set a gap (hereinafter, doctor gap) therebetween. Specifically, one end face of the regulating member faces a surface of the agent carrying member across the doctor gap. Such an end face of the regulating member is referred as a regulating face of the regulating member. To set a thinner agent layer on the agent carrying member, the doctor gap may be set to smaller. However, it may be difficult to set a small doctor gap with higher precision.

In light of such difficultness of providing a small doctor gap, some related art propose a development unit that uses a regulating member that includes an attached magnetic member to set a relatively greater doctor gap while reducing a thickness of agent layer.

A doctor gap can be set greater by providing a magnetic member in a regulating member as described below. When a regulating member includes a magnetic member, a density of developing agent in the doctor gap can be set to a smaller amount as compared to a regulating member having no magnetic member.

When the regulating member includes the magnetic member, the magnetic member and a magnetic field generator (e.g., a magnet) disposed in the agent carrying member can form a magnetic field in and around the doctor gap, and chains of developing agent (hereinafter, agent chains) are formed along magnetic force lines. Such agent chains are formed with some interval spaces among adjacent agent chains, and thereby a density of developing agent in the doctor gap can be set to a smaller amount as compared to a regulating member having no magnetic member, in which chains of developing agent may not be formed between the regulating member and the agent carrying member.

If a density of developing agent in the doctor gap can be set small by forming such agent chains, an amount of developing agent passing the doctor gap may not fluctuate so much even if a distance of the doctor gap is changed (i.e., increased or decreased). Accordingly, a relatively greater doctor gap can be set while reducing a thickness of agent layer.

Such a regulating member is mainly composed of a magnetic member and a non-magnetic member. Specifically, the magnetic member is fixed on the non-magnetic member while setting one end face of the magnetic member and one end face of the non-magnetic member in a substantially flush state each other. The flush state face is used as a regulating face of the regulating member in which the regulating face faces the agent carrying member. However, the end face of the non-magnetic member and the end face of the magnetic member have some bump or step therebetween although both faces may be set in a substantially flush state.

If such regulating member including a bump or a step on the regulating face is used, an amount of developing agent passing the doctor gap may fluctuate over time. Thus, developing agent may not be supplied to a developing area as reliably.

Such fluctuation may occur as described below. When developing agent passes the doctor gap, toner may be softened by heat, such as frictional heat and heat transmitted from a heat source disposed in an image forming apparatus, for example. If the regulating member has a regulating face including a bump or step, such softened toner may enter, stick, and gradually accumulate in the bump or step. Further, other foreign materials may also enter, and stick to the bump or step. If such foreign materials cover the magnetic member, the intensity of magnetic force in the doctor gap becomes weak, and thereby agent chains may not be formed sufficiently in the doctor gap. If the agent chains are not formed sufficiently, a density of developing agent passing the doctor gap may become high, and thereby an amount of developing agent passing the doctor gap may increase over time. Accordingly, an amount of developing agent passing the doctor gap may fluctuate over time, by which developing agent may not be supplied to a developing area reliably.

Further, if the regulating face of the regulating member includes bump or step, foreign materials may locally accumulate in a direction perpendicular to a surface-moving direction of the agent carrying member. If foreign materials accumulate as such, an amount of developing agent passing a portion corresponding to accumulated foreign materials may become smaller, by which abnormal image, such as white streak may occur, for example.

Japanese Patent Application Publication No. 2004-191529 discloses a technology of using a clad plate as a regulating member. Specifically, a magnetic plate and a non-magnetic plate are stacked on one another, and bonded together by a rolling process to form a clad plate. Such a clad plate is cut, and a cut face of the clad plate is used as a regulating face of a regulating member. In such a regulating member, an end face of the magnetic plate and an end face of the non-magnetic plate may be set in a flush state with little bump or step.

However, such manufacturing method may have some drawbacks for manufacturing a regulating member having a relatively greater size, which is widely used in the market. If a regulating member having a great size is to be prepared by such rolling process, a great-sized rolling machine may be required, and thereby a manufacturing cost of regulating member may become high. Further, the clad plate having the magnetic plate and the non-magnetic plate may need to be fixed with a greater force using a specific device to prevent peeling of the magnetic plate and the non-magnetic plate when cutting the clad plate. Accordingly, such a configuration may increase a manufacturing cost of regulating member high.

SUMMARY

A method of manufacturing developing agent regulating member that includes a magnetic member and a non-magnetic member with little bump or step on a regulating face of the developing agent regulating member, with reduced cost is desired.

In an exemplary aspect of the present invention, a method of manufacturing a developing agent regulating member for regulating an amount of a developing agent that passes through a space between a regulating face of the developing agent regulating member and a surface of a developing agent carrying member is provided. The method includes providing a non-magnetic member and a magnetic member. The non-magnetic member and the magnetic member are fixed together by caulking such that an end face of the non-magnetic member and an end face of the magnetic member are substantially aligned with each other, and such that the non-magnetic member and the magnetic member are closely pressed together in order to reduce a gap between the non-magnetic member and the magnetic member. The end face of the non-magnetic member and the end face of the magnetic member are polished so as to prepare the regulating face of the developing agent regulating member by making the end face of the non-magnetic member and the end face of the magnetic member flush.

In another exemplary aspect of the present invention, a developing agent regulating member is configured to regulate an amount of a developing agent that passes through a space between a regulating face of the developing agent regulating member and a surface of a developing agent carrying member is provided. The developing agent regulating member includes a non-magnetic member. The non-magnetic member includes a first end face, a first substantially flat mating face, and a first projection that projects beyond the first mating face. The developing agent regulating member also includes a magnetic member fixed on the non-magnetic member. The magnetic member includes a second end face, a second substantially flat mating face, and a through hole that extends from the second mating face through the magnetic member. The non-magnetic member and the magnetic member are fixed to each other such that the first mating face faces the second mating face, such that the first end face is flush with the second end face, and such that the projection of the non-magnetic member extends through the through hole of the magnetic member.

In another exemplary aspect of the present invention, a developing agent regulating member configured to regulate an amount of a developing agent that passes through a space between a regulating face of the developing agent regulating member and a surface of a developing agent carrying member is provided. The developing agent regulating member includes a non-magnetic member, a magnetic member, and a means for fixing the non-magnetic member to the magnetic member such that an end face of the non-magnetic member and an end face of the magnetic member are flush with each other, and such that the non-magnetic member and the magnetic member are closely pressed together in order to reduce a gap between the non-magnetic member and the magnetic member.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
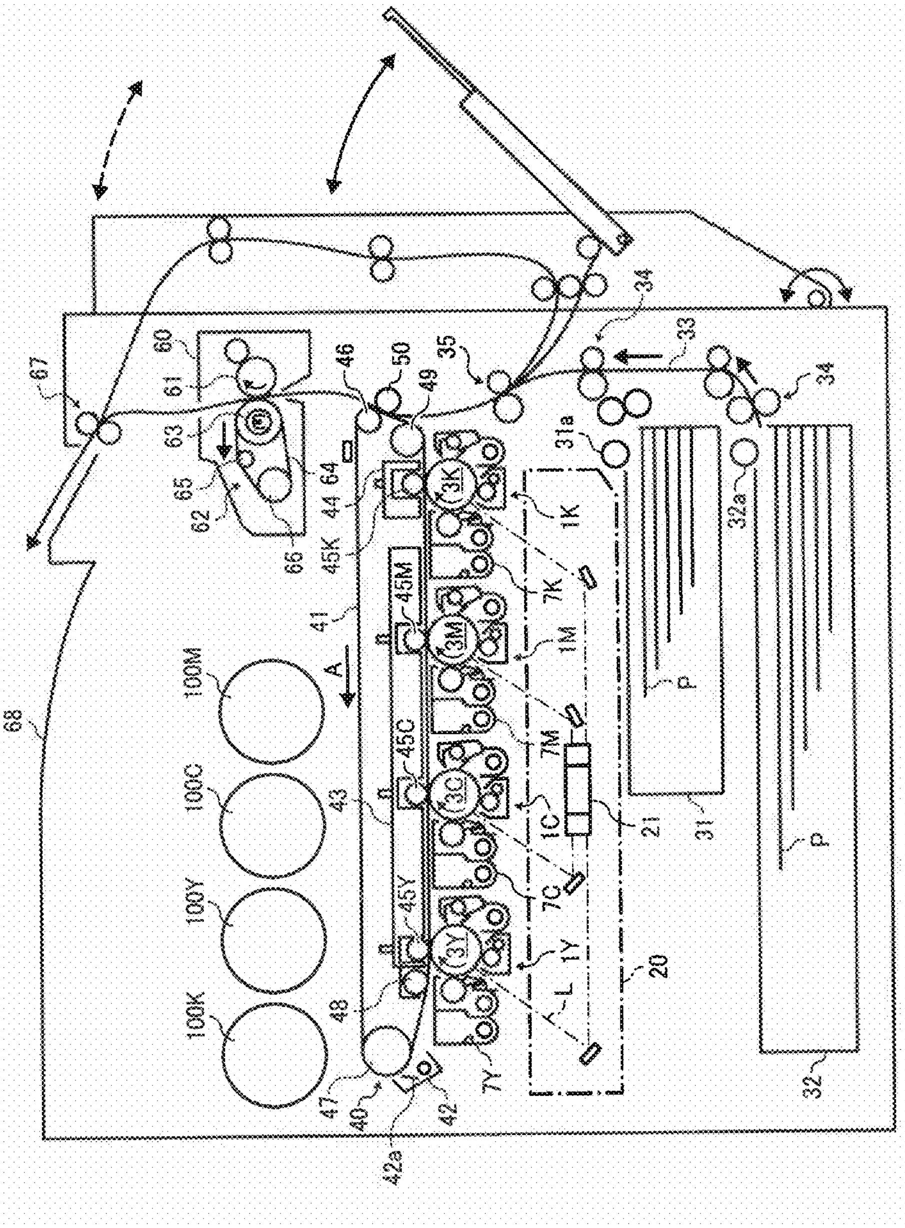
FIG. 1 illustrates a schematic configuration of an image forming apparatus according to an exemplary embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms “a”, “an” and “the” are intended to include the plural forms as well, unless the context clearly indicates otherwise. Moreover, the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded views shown in the drawings, specific terminology is employed for the sake of clarity, the present disclosure is not limited to the specific terminology so selected and it is to be understood that each specific element includes all technical equivalents that operate in a similar manner.

In the context of this application, the term “caulking” is used to refer to the process of deforming a head of an engagement projection of a first element with a punch so as to fix the first element to a second element.

Referring now to the drawings, an image forming apparatus employing a developing agent regulating member according to an exemplary embodiment is described with reference to drawings. The image forming apparatus may employ electrophotography, for example, but not limited thereto.

FIG. 1 illustrates a schematic configuration of an image forming apparatus according to an exemplary embodiment. The image forming apparatus includes process cartridges 1Y, 1C, 1M, and 1K for forming toner images of yellow, magenta, cyan, black respectively. In this disclosure, the suffix letters of Y, M, C, and K attached to devices or the like for respectively indicating colors of yellow (Y), magenta (M), cyan (C), and black (K), and such suffix letters may be omitted when several devices or like may function substantially similar manner for the simplicity of expression. The process cartridges 1Y, 1C, 1M, and 1K have a similar configuration one another except toner colors of Y, C, M, and K toner.

Figure 2:
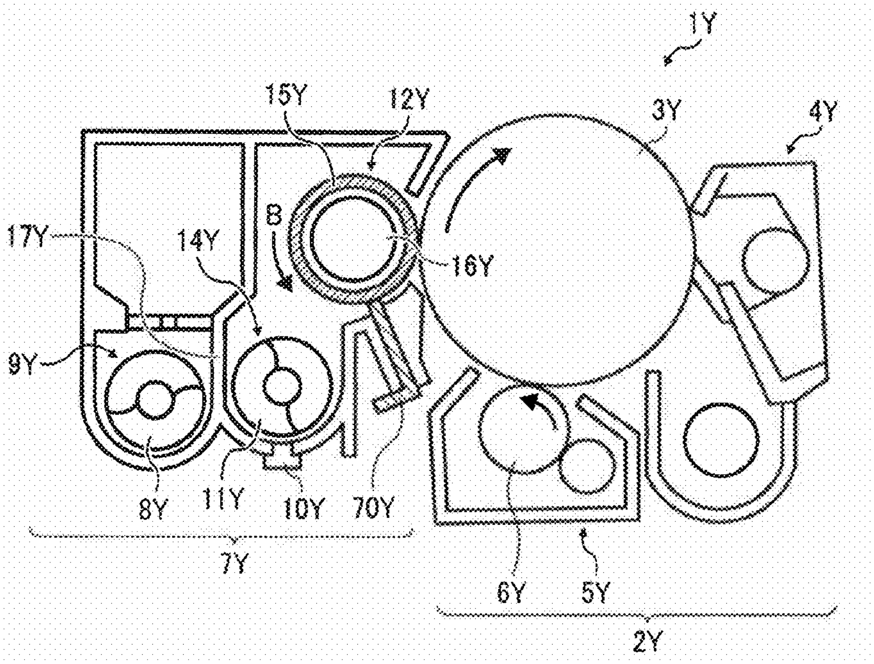
FIG. 2 illustrates a schematic configuration of a process cartridge of the image forming apparatus of FIG. 1.

As illustrated in FIG. 2, the process cartridge 1Y, which forms Y toner image, includes a photoconductor unit 2Y, and a development unit 7Y. The process cartridge 1Y, integrating the photoconductor unit 2Y and the development unit 7Y, is detachably mountable to the image forming apparatus. Further, the development unit 7Y is detachably mountable to the process cartridge 1Y when the process cartridge 1Y is removed from the image forming apparatus. Accordingly, the photoconductor unit 2Y and the development unit 7Y can be separated from each other.

As illustrated in FIG. 2, the photoconductor unit 2Y includes a photoconductor 3Y, a drum cleaning unit 4Y, a charging unit 5Y, and a de-charging unit, for example. The photoconductor 3Y used as a latent image carrier has a drum shape, for example.

The charging unit 5Y, which includes a charge roller 6Y, uniformly charges a surface of the photoconductor 3Y, rotating in a clockwise direction in FIG. 2 by a driving unit, to a given polarity, such as negative polarity. In FIG. 2, the charge roller 6Y, supplied with a charging bias voltage from a power source and rotating in a counter-clockwise direction in FIG. 2, uniformly charges the photoconductor 3Y. In such a configuration, the charge roller 6Y is disposed in proximity to the photoconductor 3Y. Instead of the charge roller 6Y, a charge brush may be used, for example. Further, the photoconductor 3Y can be uniformly charged using a non-contact charging method, such as a scrotoron charger. After the charging unit 5Y uniformly charges a surface of the photoconductor 3Y, an optical writing unit, to be described later, emits and scans a laser beam on the photoconductor 3Y to form an electrostatic latent image of Y image on the photoconductor 3Y.

As illustrated in FIG. 2, the development unit 7Y includes a first compartment 14Y, and a second compartment 9Y. The first compartment 14Y includes a toner concentration sensor 10Y, a first transport screw 11Y, a developing roller 12Y, and a doctor blade 70Y, for example. The toner concentration sensor 10Y may be a magnetic permeability sensor, for example. The doctor blade 70Y regulates an amount of developing agent on the developing roller 12Y. The second compartment 9Y includes a second transport screw 8Y. Y developing agent, mainly composed of magnetic carrier and Y toner charged to negative polarity, is stored in the first compartment 14Y and the second compartment 9Y. The second transport screw 8Y, driven by a driving unit, transports the Y developing agent in one direction in the second compartment 9Y. The Y developing agent transported to one end of the second compartment 9Y is moved to the first compartment 14Y via a communication port formed on a separation wall 17Y set between the second compartment 9Y and the first compartment 14Y.

The first transport screw 11Y, driven by a driving unit, transports the Y developing agent in another direction in the first compartment 14Y, wherein toner transport directions in the first compartment 14Y and the second compartment 9Y are opposite each other. The toner concentration sensor 10Y, disposed at a bottom of the first compartment 14Y, detects toner concentration in the Y developing agent.

As illustrated in FIG. 2, the developing roller 12Y is disposed over the first transport screw 11Y in a parallel manner. The developing roller 12Y includes a developing sleeve 15Y, and a magnet roller 16Y encased in the developing sleeve 15Y. The developing sleeve 15Y, made of a non-magnetic tube, can be rotated in a counter-clockwise direction B, as seen in FIG. 2, for example.

Some of the Y developing agent transported by the first transport screw 11Y is carried up to the developing sleeve 15Y with magnetic force generated by the magnet roller 16Y. The doctor blade 70Y, set at a given position while maintaining a given gap with the developing sleeve 15Y, regulates a thickness of Y developing agent on the developing sleeve 15Y. Then, the Y developing agent is transported to a developing area facing the photoconductor 3Y, and Y toner is attracted to an electrostatic latent image of Y image on the photoconductor 3Y to develop a Y toner image on the photoconductor 3Y. The Y developing agent, which consumed Y toner by a developing process, is returned to the first transport screw 11Y with a rotation of the developing sleeve 15Y of the developing roller 12Y. The returned Y developing agent is transported in the first compartment 14Y, and then moved to the second compartment 9Y via a communication port set between the first compartment 14Y and the second compartment 9Y. As such, the developing agent can be circulated and transported in the first compartment 14Y and the second compartment 9Y of the development unit 7Y.

The toner concentration sensor 10Y detects magnetic permeability of Y developing agent, and transmits a detection result to a control unit as a voltage signal. Because the magnetic permeability of Y developing agent is correlated to Y toner concentration in the Y developing agent, the toner concentration sensor 10Y outputs a voltage signal corresponding to an actual Y toner concentration. The control unit has a memory, which stores reference voltage data of Y Vtref, C Vtref, M Vtref, and K Vtref, used as target voltage for toner concentration of each of color. The memory may be a random access memory (RAM) or the like, but not limited to these.

The control unit compares an output voltage of the toner concentration sensor 10Y with the Y Vtref for the development unit 7Y, and activates a Y toner supply unit for a given time computed from the data comparison. With such activation, a given amount of fresh Y toner is supplied to the second compartment 9Y and mixed with Y developing agent having lower Y toner concentration due to Y toner consumption by a developing process. Accordingly, Y toner concentration of Y developing agent in the first compartment 14Y can be maintained within a given range. Such toner concentration control is also conducted for other developing agents used in the process cartridges 1C, 1M, and 1K.

As illustrated in FIG. 1, an optical writing unit 20 is disposed under the process cartridges 1Y, 1C, 1M, and 1K. The optical writing unit 20 emits a laser beam L, based on image information, to the photoconductors 3Y, 3C, 3M, and 3K of the process cartridges 1Y, 1C, 1M, and 1K. With such laser beam irradiation, electrostatic latent images of Y, C, M, and K are formed on the photoconductors 3Y, 3C, 3M, and 3K, which are uniformly charged in advance by a charging process. The photoconductor 3 charged by a charging process has a given negative potential. When the laser beam L is irradiated on such a charged photoconductor 3 for forming a latent image on the photoconductor 3, a latent image forming portion is set to another negative potential, which is lower than the given negative potential having no latent image.

The optical writing unit 20 includes a light source, a polygon mirror 21, a polygon motor, and a plurality of lenses and mirrors, for example. The laser beam L emitted from the light source is deflected by the polygon mirror 21 driven by the polygon motor, and passes a plurality of lenses and mirrors, and then scans the photoconductors 3Y, 3C, 3M, and 3K. Instead of such configuration, the optical writing unit 20 may employ an LED (light emitting diode) array for scanning operation.

In FIG. 2, the developing sleeve 15Y, made of an insulation material, is supplied with a developing bias voltage by a voltage applicator. Such developing bias voltage has a given negative potential, which is set between a potential of the electrostatic latent image on the photoconductor 3Y and a potential of non-latent image portion of the photoconductor 3Y.

With such configuration, a development electric field is generated around a developing area set between the developing sleeve 15Y and the photoconductor 3Y, and toner is transferred from the developing sleeve 15Y to the electrostatic latent image on the photoconductor 3Y, and thereby Y toner image is formed on the photoconductor 3Y.

The Y toner image formed on the photoconductor 3Y is transferred to an intermediate transfer belt, to be described later. The drum cleaning unit 4Y removes toner remaining on the photoconductor 3Y after an intermediate transfer process. After such cleaning process, the photoconductor 3Y is decharged by a de-charging unit to prepare the photoconductor 3Y for a next image forming operation. Such intermediate transfer process and cleaning process are similarly conducted for the photoconductors 3C, 3M, and 3K of the process cartridges 1C, 1M, and 1K.

Returning to FIG. 1, a first sheet cassette 31 and a second sheet cassette 32 are disposed under the optical writing unit 20 to store a given volume of recording medium P therein. A first feed roller 31*a* and a second feed roller 32*a* are pressed to a top sheet in the sheet cassettes 31 and 32. When the first feed roller 31*a* is driven by a driving unit in a counter-clockwise direction, the top sheet in the first sheet cassette 31 is ejected to a sheet feed route 33 as the recording medium P. Further, when the second feed roller 32*a* is driven by a driving unit in a counter-clockwise direction, the top sheet in the second sheet cassette 32 is ejected to a sheet feed route 33 as the recording medium P. The sheet feed route 33 has a plurality of transport rollers 34 for transporting the recording medium P in the sheet feed route 33 in a given direction.

At an end of the sheet feed route 33, a registration roller(s) 35 is disposed. The registration roller 35 sandwiches the recording medium P by a pair of rollers and stops a rotation of rollers for a given time. Then, the registration roller 35 feeds the recording medium P to a secondary transfer nip, to be described later, at a given timing.

A transfer unit 40 is disposed over the process cartridges 1Y, 1C, 1M, and 1K, for example. The transfer unit 40 includes an intermediate transfer belt 41, a belt cleaning unit 42, a first bracket 43, a second bracket 44, primary transfer rollers 45Y, 45C, 45M, and 45K, a backup roller 46, a drive roller 47, a support roller 48, and a tension roller 49, for example. The intermediate transfer belt 41, extended by such rollers, travels in a counter-clockwise direction shown by an arrow A endlessly when the drive roller 47 is driven, for example.

The primary transfer rollers 45Y, 45C, 45M, and 45K are disposed at an inner face side of the intermediate transfer belt 41 to press the intermediate transfer belt 41 to the photoconductors 3Y, 3C, 3M, and 3K. Such intermediate transfer belt 41 and the photoconductors 3Y, 3C, 3M, and 3K form a primary transfer nip therebetween. The primary transfer rollers 45Y, 45C, 45M, and 45K are supplied with a bias voltage having a polarity, opposite to a polarity of toner image. Specifically, because the toner image has a negative polarity, for example, a positive polarity is supplied to primary transfer rollers 45Y, 45C, 45M, and 45K, by which the intermediate transfer belt 41 is charged to a positive polarity, and a transfer electric field is generated around the primary transfer nip to transfer toner images from the photoconductors 3Y, 3C, 3M, and 3K to the intermediate transfer belt 41. Such Y, C, M, and K toner images are sequentially superimposed on the intermediate transfer belt 41 when the intermediate transfer belt 41 passes the primary transfer nip for Y, C, M, and K, by which a superimposed toner image is formed on the intermediate transfer belt 41.

The backup roller 46, a secondary transfer roller 50, and the intermediate transfer belt 41 set the secondary transfer nip. The registration roller 35 feeds the recording medium P to the secondary transfer nip at a given timing, synchronized to a formation of the superimposed toner image on the intermediate transfer belt 41.

The secondary transfer roller 50 is supplied with a secondary transfer bias voltage having a polarity, opposite to a polarity of the toner image, and the secondary transfer roller 50 applies such secondary transfer bias voltage to the intermediate transfer belt 41. With such configuration, a secondary transfer electric field is generated around the secondary transfer nip. The toner image is secondary transferred from the intermediate transfer belt 41 to the recording medium P with an effect of secondary transfer electric field and a nip pressure by the secondary transfer roller 50 and the backup roller 46, by which a full color toner image is formed on the recording medium P.

After such secondary transfer process, the belt cleaning unit 42 cleans toner remaining on the intermediate transfer belt 41 (i.e., toner not transferred to the recording medium P). The belt cleaning unit 42 may have a cleaning blade 42*a* pressed to the intermediate transfer belt 41 to remove toner from the intermediate transfer belt 41.

The first bracket 43 of the transfer unit 40 may pivot about the support roller 48 with a given angle range using a solenoid. When a monochrome image is formed by the image forming apparatus, the first bracket 43 may be pivoted in a counter-clockwise direction in FIG. 1 using the solenoid. With such pivoting operation, the primary transfer rollers 45Y, 45C, and 45M are pivoted about the support roller 48 with a given angle, by which the primary transfer rollers 45Y, 45C, and 45M and the intermediate transfer belt 41 are separated from the photoconductors 3Y, 3C, and 3M. Then, a monochrome image is formed by using only the process cartridge 1K. Because the process cartridges 1Y, 1C, and 1M are not activated when a monochrome image is formed by the image forming apparatus, a lifetime of the process cartridges 1Y, 1C, and 1M can be enhanced.

Further, a fixing unit 60 is disposed over the secondary transfer nip. The fixing unit 60 includes a heat/pressure roller 61, and a fixing belt unit 62. The heat/pressure roller 61 includes a heat source, such as for example halogen lamp. The fixing belt unit 62 includes a fixing belt 64, a heat roller 63 having a heat source (e.g., halogen lamp), a tension roller 65, a drive roller 66, and a temperature sensor, for example. The fixing belt 64, extended by the heat roller 63, the tension roller 65, and the drive roller 66, travels in a counter-clockwise direction in FIG. 1, for example. The fixing belt 64 can be heated by the heat roller 63 when the fixing belt 64 travels in a counter-clockwise direction. The heat/pressure roller 61, the heat roller 63, and the fixing belt 64 form a fixing nip therebetween. Specifically, the heat/pressure roller 61 rotating in a clockwise direction in FIG. 1 is pressed to the fixing belt 64 rotating in a counter-clockwise direction in FIG. 1 at the fixing nip, for example.

A temperature sensor is disposed above the fixing belt 64 with a given gap to detect surface temperature of the fixing belt 64 before entering the fixing nip. The detected surface temperature information is transmitted to a fixing power source unit. The fixing power source unit controls ON/OFF of power supply to the heat sources in the heat roller 63 and the heat/pressure roller 61 based on detected surface temperature information. With such configuration, the surface temperature of the fixing belt 64 may be maintained at a given temperature, such as about 140 degrees Celcius, for example.

After the secondary transfer process, the recording medium P is transported to the fixing unit 60, in which the full color toner image is fixed on the recording medium P by a nip pressure and heat of the fixing belt 64 at the fixing nip.

After such fixing process, the recording medium P is ejected out of the image forming apparatus by an ejection roller 67, and stacked on a stack tray 68 of the image forming apparatus, for example.

Further, toner cartridges 100Y, 100C, 100M, and 100K may be disposed over the transfer unit 40 to store Y, C, M, and K toner, respectively. The Y, C, M, and K toner are respectively supplied from the toner cartridge 100Y, 100C, 100M, and 100K to the development units 7Y, 7C, 7M, and 7K of the process cartridges 1Y, 1C, 1M, and 1K at a given timing. The toner cartridge 100Y, 100C, 100M, and 100K are detachably mountable to the image forming apparatus, for example.

In an exemplary embodiment, the photoconductor has a given surface moving speed (or linear velocity) (e.g., 180 mm/sec), the developing agent uses ferrite carrier having a given average particle diameter (e.g., 35 μm), a reference toner concentration in the developing agent is set to given value (e.g., about 7 wt %), and the developing bias voltage uses a DC (direct current) bias voltage, for example. However, such conditions can be changed within a spirit of the present invention.

A description is now given to a method of manufacturing a doctor blade used as a developing agent regulating member according to an exemplary embodiment.

Figure 3:
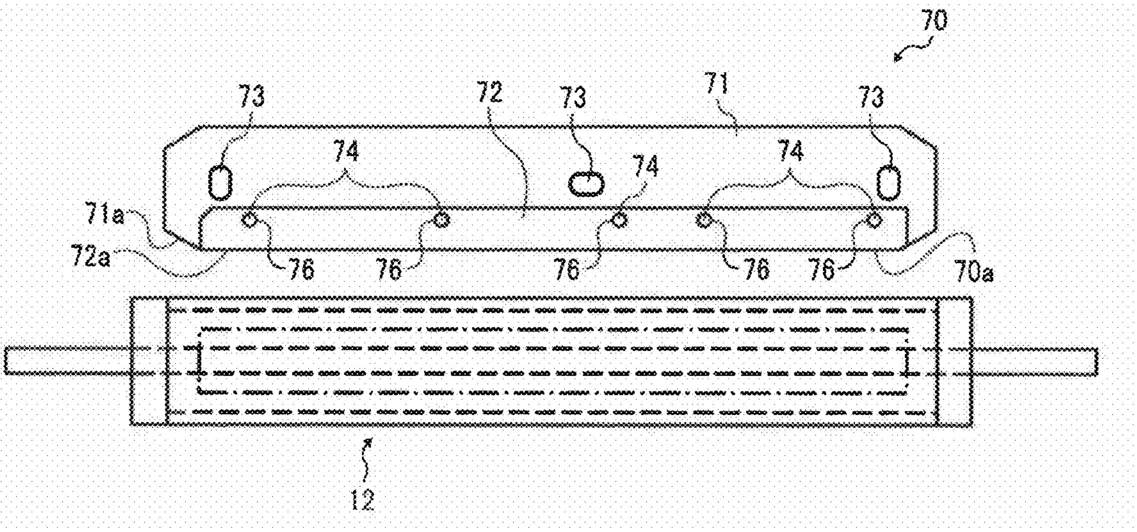
FIG. 3 illustrates a schematic configuration of a doctor blade and a developing roller in a development unit of the image forming apparatus of FIG. 1, viewed from a direction perpendicular to an axial direction of the developing roller.

FIG. 3 illustrates a schematic configuration of the doctor blade 70 and the developing roller 12 viewed from a direction perpendicular to an axial direction of the developing roller 12. The doctor blade 70 includes a non-magnetic plate 71, and a magnetic plate 72, for example.

The non-magnetic plate 71 is made of a non-magnetic material formed in a rectangular shape or plate shape, such as stainless steel (SUS). Such non-magnetic material may be SUS304, SUS316, or the like, for example, but not limited thereto. The magnetic plate 72 is made of a magnetic material formed in a rectangular shape or plate shape, which may be smaller than the non-magnetic plate 71. Such magnetic material may be SUS430 or the like, for example. The non-magnetic plate 71 may have a given thickness greater than a thickness of the magnetic plate 72. For example, the non-magnetic plate 71 can have a thickness of 1 mm to 3 mm, and the magnetic plate 72 can have a thickness of 0.1 mm to 0.3 mm. In an exemplary embodiment, the non-magnetic plate 71 is made of SUS304 plate having a thickness of 2 mm, and the magnetic plate 72 is made of SUS430 plate having a thickness of 0.3 mm, for example. Further, to enhance strength of the doctor blade 70, one end portion of the non-magnetic plate 71, which is opposite to a regulating face 70*a* of the doctor blade 70, may be bent in an L shape.

The doctor blade 70, including the non-magnetic plate 71 and the magnetic plate 72, can be prepared or manufactured from base materials as described below. Such a plate forming process can be conducted by using a conventional a press working machine, for example.

A method of preparing the non-magnetic plate 71 is described as below. First, a base material is set to a press working machine. Then the press working machine is activated to form a mounting hole 73 on the base material, to be used as the non-magnetic plate 71. The mounting hole 73, which is a through hole, may be formed at a plurality of portions of the non-magnetic plate 71. For example, the mounting hole 73 can be formed at a center and end portions of the non-magnetic plate 71. A screw is inserted to the mounting hole 73 to fix the doctor blade 70 to a casing of the development unit 7.

Figure 4:
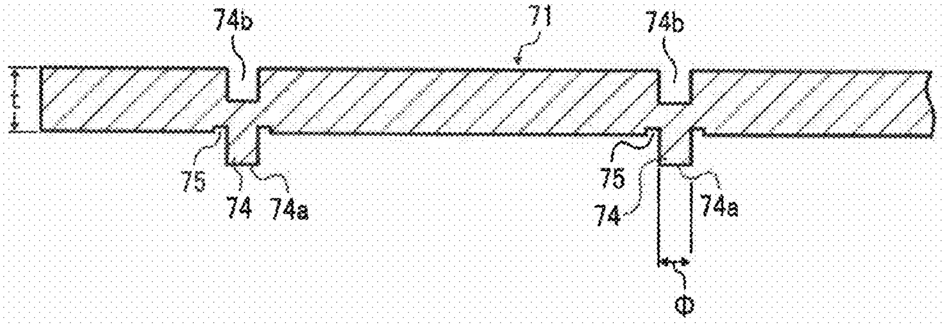
FIG. 4 illustrates a schematic cross-sectional view of a non-magnetic plate of the doctor blade of FIG. 3.

Further, as shown in FIG. 4, an engagement projection 74 may be formed at a plurality of portions on the non-magnetic plate 71 with a given interval along an axial direction of the developing roller 12. The engagement projection 74, formed on the non-magnetic plate 71 by half blanking process, has a cylindrical shape, for example. Further, a loop groove 75 is formed around a root portion of the engagement projection 74.

Figure 5:
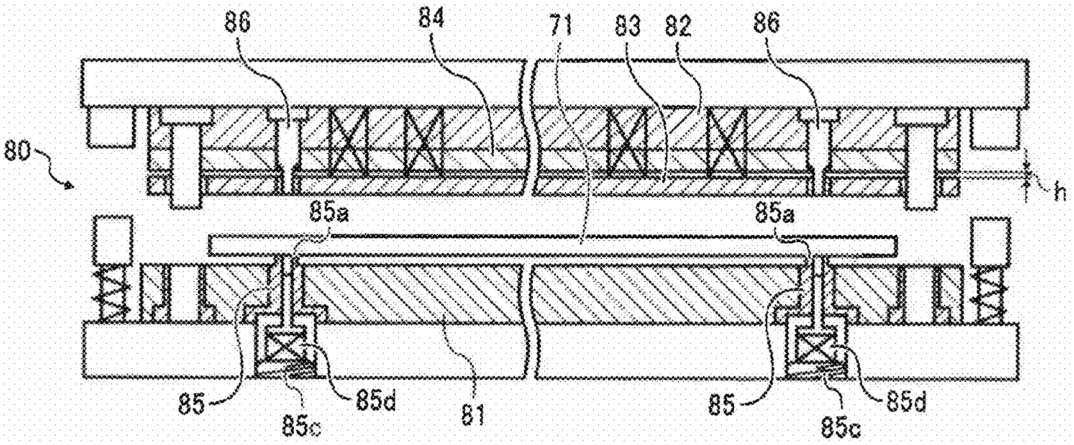
FIG. 5 illustrates a schematic configuration of a die assembly for forming an engagement projection on a non-magnetic plate by a half blanking process.

A description is given to a process of forming the engagement projection 74 on the non-magnetic plate 71 using a die assembly 80 shown in FIG. 5. The die assembly 80 includes a die plate 81, a punch plate 82, a stripper 83, and a body plate 84, for example. An upper part of the die assembly 80 (having the punch plate 82, the stripper 83, and the body plate 84) moves toward the die plate 81 in a vertical direction. The die plate 81 is disposed with a plurality of die buttons 85 in a longitudinal direction of the non-magnetic plate 71 with a given interval. The die button 85 has a tubular shape, for example.

The die button 85 has a projected portion 85*a* projecting from a upper face of the die plate 81 for a given projected height H (see FIG. 6), such as about 50 micrometer, for example. As illustrated in FIG. 5, the punch plate 82 has a plurality of process punches 86 having cylindrical shape corresponding to the plurality of die buttons 85.

As illustrated in FIG. 5, the non-magnetic plate 71 is set on the die plate 81, and sandwiched by the punch plate 82, the stripper 83, and the die plate 81, in which the process punch 86 presses the non-magnetic plate 71. With such press processing, a depression 74*b* (see FIG. 4) is formed on the non-magnetic plate 71 by the process punch 86, and the engagement projection 74 is formed at an opposite side of the depression 74*b* as illustrated in FIG. 4. Specifically, the process punch 86 presses one face of the non-magnetic plate 71 to form the depression 74*b*, and a portion pressed by the process punch 86 is extruded toward the die button 85 to form the engagement projection 74, in which a half blanking process is used to form the engagement projection 74.

Figure 6:
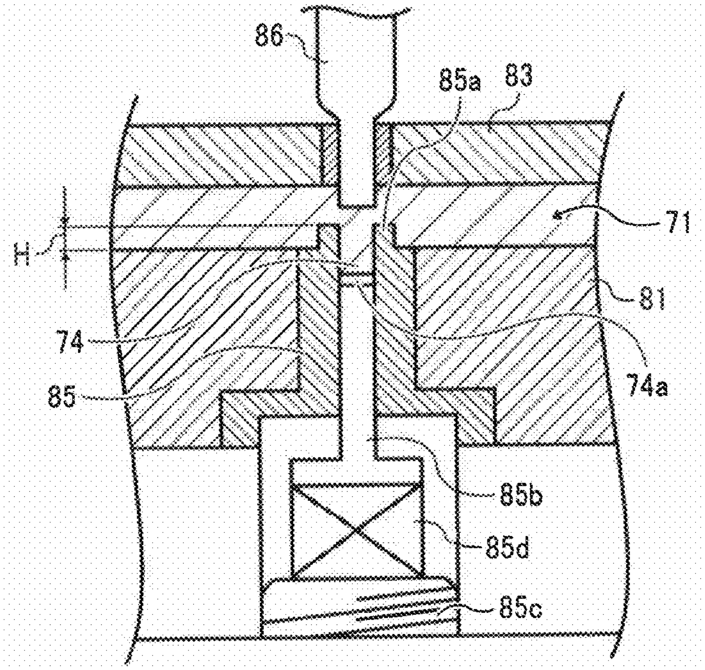
FIG. 6 illustrates an expanded view of a die button used in the die assembly of FIG. 5.

The engagement projection 74, formed in the die button 85, receives a force from a spring 85*d* and an eject pin 85*b* shown FIG. 6, by which the engagement projection 74 can be ejected out from the die button 85. The projected height H is determined based on a distance h between the body plate 84 and the stripper 83 (see FIG. 5). FIG. 6 also shows a stopper screw 85*c*.

Figure 7:
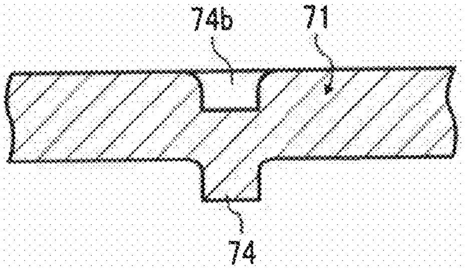
FIG. 7 illustrates a partially expanded view of a non-magnetic plate formed with an engagement projection prepared by a half blanking process without using the die button of FIG. 6.

Further, the projected portion 85*a* of the die button 85 is used to form the loop groove 75 around the root portion of the engagement projection 74. The die button 85 is used to shape the engagement projection 74 in a relatively well-defined shape having little irregularity. Specifically, by providing the die button 85 to the die plate 81, a root portion of the engagement projection 74 having a cylindrical shape can be shaped in a relatively well-defined shape. If the die button 85 is not provided to the die plate 81, the engagement projection 74 may be shaped in an irregular shape as shown in FIG. 7, in which a root portion of the engagement projection 74 may have a deformed shape.

In an exemplary embodiment, a face of the non-magnetic plate 71 having the engagement projection 74 to be attached to the magnetic plate 72 has a well-defined shape. In other words, such face of the non-magnetic plate 71 is substantially free from irregular shape.

After such process, an outer form of the non-magnetic plate 71 is processed by a conventional die/punch cut process, and burr generated by the die/punch cut is removed.

Figure 8:
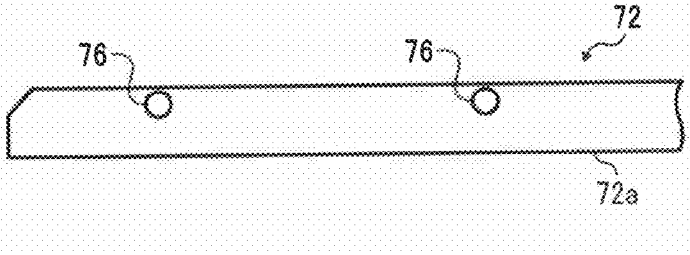
FIG. 8 illustrates a partially expanded plan view of a magnetic plate of the doctor blade of FIG. 3.

A description is given to a process of forming the magnetic plate 72. First, a base material is set on a press working machine, and then the press working machine is activated to form an engagement hole 76 shown in FIG. 8. The engagement hole 76 corresponds to the engagement projection 74 of the non-magnetic plate 71. The engagement hole 76 can be formed on the magnetic plate 72 by using a conventional punching die assembly. The engagement hole 76 has a given diameter, slightly greater than a diameter of the engagement projection 74 so that the magnetic plate 72 can be set on to the non-magnetic plate 71 easily. After such a punching process for the engagement hole 76, an outer form of the magnetic plate 72 is processed by a conventional die/punch cut process, and burrs generated by the die/punch cut process are removed.

In an exemplary embodiment, the base material of the magnetic plate 72 may be a plate, cut from a rolled steel plate, for example. In general, the higher the flatness of base material, the higher the flatness of the magnetic plate 72. A base material having a higher flatness can be prepared by cutting the rolled steel plate in a roll axial direction, which is perpendicular to a rolling direction of the rolled steel plate. With such cutting, a longitudinal direction of the magnetic plate 72 can be aligned to the roll axial direction.

If a width of the rolled steel plate is not sufficient for a length of the magnetic plate 72, a base material may be cut in a direction slanted from the roll axial direction of the rolled steel plate. However, the more slanted from the roll axial direction the cut is made, the more curved the magnetic plate 72 will be. If the magnetic plate 72 has great curved shape, a fixing process of the magnetic plate 72 to the non-magnetic plate 71 may become complex.

Figure 9:
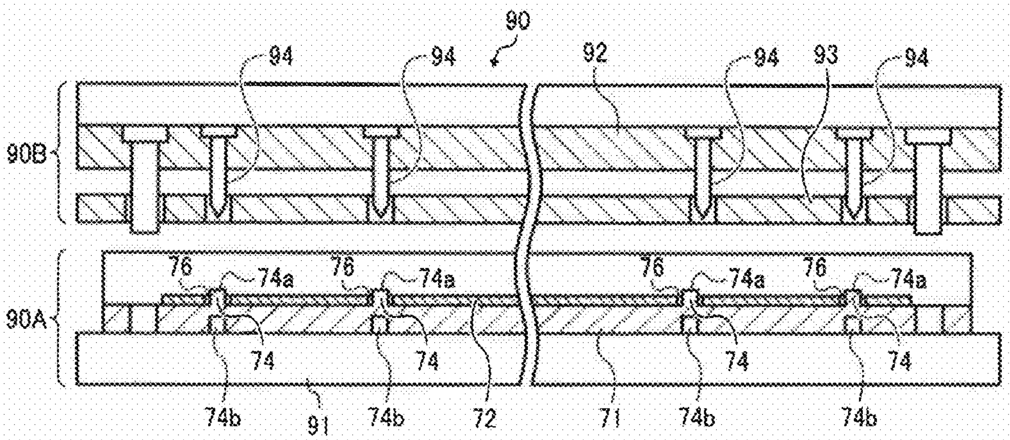
FIG. 9 illustrates a schematic configuration of a caulking die assembly used for fixing a non-magnetic plate and a magnetic plate by caulking.
Figure 10A:
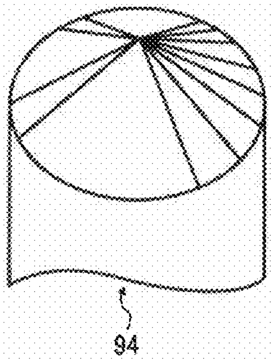
FIG. 10A to FIG. 10C illustrate schematic perspective views of caulking punches having different head shapes used in the caulking die assembly of FIG. 9, in which a caulking punch has a conical shape head in FIG. 10A, a V-shaped head in FIG. 10B, and a rosette-like head in FIG. 10C.
Figure 10B:
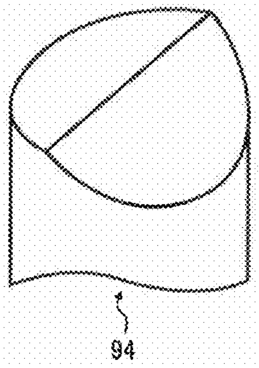
Figure 10C:
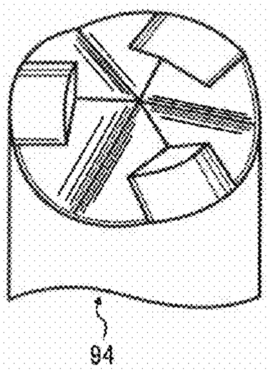

A description is now given to a fixing process of the non-magnetic plate 71 and the magnetic plate 72 with reference to FIG. 9. The magnetic plate 72 is fixed with the non-magnetic plate 71 using a caulking assembly 90 shown in FIG. 9. The caulking assembly 90 includes a lower part 90A having a die plate 91, and an upper part 90B having a punch plate 92 and a stripper 93. The punch plate 92 has a caulking punch 94, corresponded to the engagement projection 74. As shown in FIG. 10, the caulking punch 94 may has several types for its head shape, such as a conical shape head (FIG. 10A), a V-shaped head (FIG. 10B), and a rosette-like head (FIG. 10C), for example. In general, the caulking punch 94 having V-shaped head may be used for caulking process.

The non-magnetic plate 71 is set on the die plate 91 with the engagement projection 74 facing upward. Then, the magnetic plate 72 is set over and on the non-magnetic plate 71 by engaging the engagement projection 74 to the engagement hole 76 of the magnetic plate 72. With such setting, a first end face 71*a* of the non-magnetic plate 71 and a second end face 72*a* of the magnetic plate 72 are set in a substantially flush state, such that the first end face 71*a* and the second end face 72*a* form the regulating face 70*a* of the doctor blade 70 (see FIG. 3). In another exemplary embodiment, the second end face 72*a* of the magnetic plate 72 is slightly projected from the first end face 71*a* of the non-magnetic plate 71 when the magnetic plate 72 is set on the non-magnetic plate 71. In another exemplary embodiment, a thickness of the magnetic plate 72 is set smaller than a thickness of the non-magnetic plate 71. Accordingly, a polishing process, to be described later, can be easily conducted by polishing the magnetic plate 72 having a smaller thickness so as to set the regulating face 70*a* in a flush state.

On one hand, if a thickness of the non-magnetic plate 71 is set smaller than a thickness of the magnetic plate 72, the first end face 71*a* of the non-magnetic plate 71 is slightly projected from the second end face 72*a* of the magnetic plate 72 to easily conduct a polishing process, to be described later. As such, a polishing process is mainly applied to a plate having a smaller thickness, by which a polishing process can be conducted easily with reduced time.

Figure 11A:
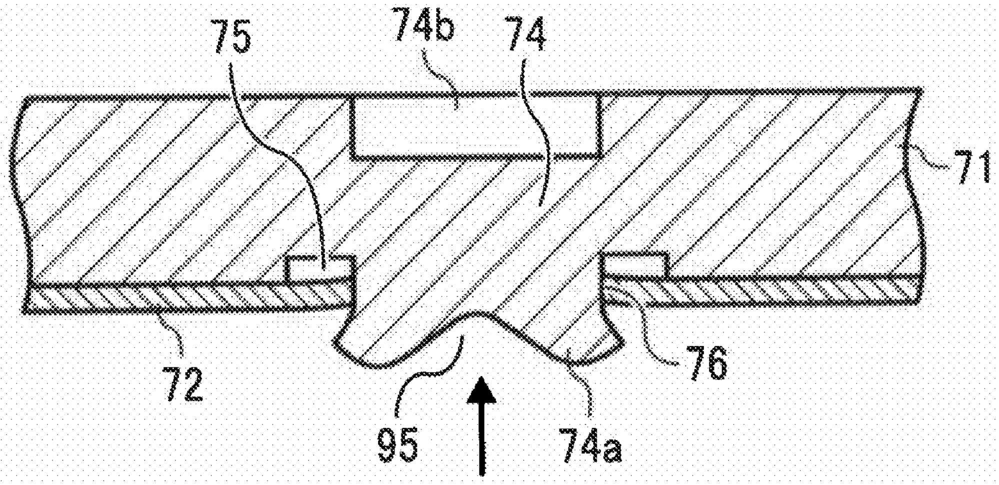
FIG. 11A illustrates an expanded view depicting a fixed condition of a non-magnetic plate and a magnetic plate, in which an engagement projection is crushed by a caulking punch of FIG. 10B.
Figure 11B:
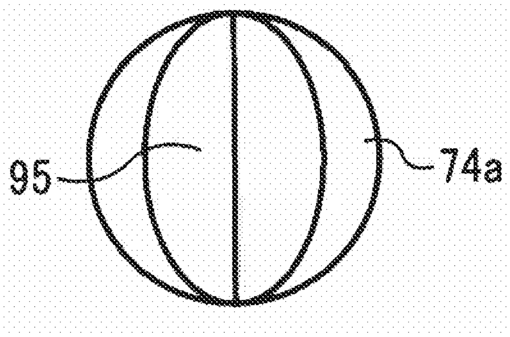
FIG. 11B illustrates an expanded view of a crushed head of an engagement projection and a crush groove formed by a caulking punch of FIG. 10B.

Returning to FIG. 9, the upper part 90B is then pressed down to the non-magnetic plate 71 and the magnetic plate 72 to press the non-magnetic plate 71 and the magnetic plate 72 by the stripper 93. Then, the caulking punch 94 is pressed to a head 74*a* of the engagement projection 74 to crush the head 74*a* into two portion as shown in FIGS. 11A and 11B. Specifically, a pressed groove 95 is formed on the head 74*a* by the caulking punch 94. FIG. 11B shows the crushed head 74*a* viewed from a direction shown by an arrow in FIG. 11A. The pressed groove 95 may preferably extend in a direction perpendicular to a longitudinal direction of the non-magnetic plate 71, for example.

As illustrated in FIG. 11A, a portion surrounding the engagement hole 76 of the magnetic plate 72 is deformed toward the loop groove 75, by which an entire face of the magnetic plate 72 is closely pressed to the non-magnetic plate 71. By pressing the magnetic plate 72 closely to the non-magnetic plate 71 with such a caulking process, a gap between the magnetic plate 72 and the non-magnetic plate 71 can be reduced. Accordingly, a gap between the first end face 71*a* of the non-magnetic plate 71 and the second end face 72*a* of the magnetic plate 72 can be reduced, wherein the first end face 71*a* and the second end face 72*a* form the regulating face 70*a* of the doctor blade 70.

After fixing the non-magnetic plate 71 and the magnetic plate 72 while setting the first end face 71*a* and the second end face 72*a* as substantially flush state, a polishing process is conducted to the first end face 71*a* and the second end face 72*a*.

In an exemplary embodiment, a polishing process is conducted by using a conventional grinding machine using grinding stone having a disciform shape, in which the grinding stone is rotated for polishing. In an exemplary embodiment, a precision grinding machine PFG-500DXA (produced by Okamaoto Machine Tool Works, Ltd) and GC grinding stone #1000 are used for a polishing process, for example. First, the non-magnetic plate 71 and the magnetic plate 72, which are fixed to each other, are set on the grinding machine. Then, the grinding machine is activated to rotate a grinding stone having the disciform shape. The grinding stone is contacted to the first end face 71*a* and the second end face 72*a* of the non-magnetic plate 71 and the magnetic plate 72 to polish for a given amount, such as 0.1 mm, for example.

In an exemplary embodiment, because the second end face 72*a* of the magnetic plate 72 is slightly projected from the first end face 71*a* of the non-magnetic plate 71, the second end face 72*a* of the magnetic plate 72 is mainly polished by the grinding stone to reduce a bump or step between the first end face 71*a* and the second end face 72*a* so as to form the regulating face 70*a* of the doctor blade 70 in flush state. Such a polishing process, which uses a relatively simple configuration, can be conducted with a reduced cost.

With such a manufacturing process for the doctor blade 70, a gap between the first end face 71*a* of the non-magnetic plate 71 and the second end face 72*a* of the magnetic plate 72 at the regulating face 70*a* can be set to a small scale, such as for example 0.01 mm or so, which can be ignored for a practical usage.

The above described caulking process for fixing the non-magnetic plate 71 and the magnetic plate 72 can be conducted with reduced cost compared to a welding method, such as laser welding described in Japanese Patent Application Publication No. 2000-137381, for example, or a conventional rolling process.

Although the end faces of the non-magnetic plate 71 and the magnetic plate 72 may deviate each other for some amount at the regulating face 70*a* during the caulking process because the non-magnetic plate 71 and the magnetic plate 72 are not yet completely fixed each other, such deviated amount can be removed from the regulating face 70*a* by a subsequent polishing process. Accordingly, the doctor blade 70 having the regulating face 70*a* with little bump or step can be manufactured with reduced cost compared to laser welding, rolling process, or the like. Further, in an exemplary embodiment, because a polishing process is conducted using a grinding stone of disciform shape, the flatness of the regulating face 70*a* of the doctor blade 70 can be attained with higher precision.

During such polishing process, a force that may peel the non-magnetic plate 71 and the magnetic plate 72 can be set smaller compared to other method, such as for example cutting a clad plate composed of a non-magnetic member and a magnetic member.

If such polishing is conducted in a direction perpendicular to a normal line direction of a fixed faces of non-magnetic plate 71 and the magnetic plate 72, a force that may peel the non-magnetic plate 71 and the magnetic plate 72 can be set smaller. Accordingly, a greater force may not be required to hold the non-magnetic plate 71 and the magnetic plate 72. Therefore, the fixed non-magnetic plate 71 and the magnetic plate 72 can be held with a less expensive machine during a polishing process, by which a manufacturing cost of the doctor blade 70 can be reduced.

A description is now given to a side face shape of the non-magnetic plate 71 prepared by the above-described die/punch cut process. In general, when a plate is die/punch cut, burrs occur on one side face of the plate (hereinafter, "burr side") and a shear droop occurs on the other side face (hereinafter, "shear-droop side").

Figure 12:
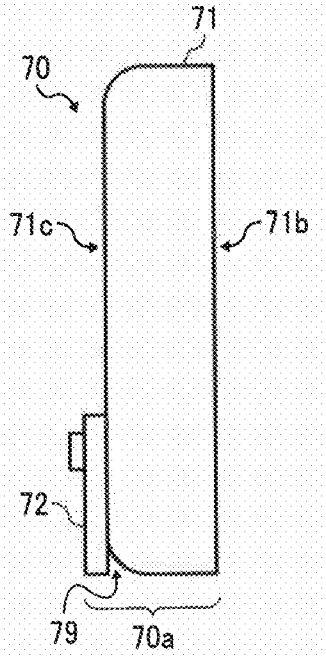
FIG. 12 illustrates one configuration of a doctor blade, in which a magnetic plate is fixed to a shear-droop side of a non-magnetic plate.
Figure 13:
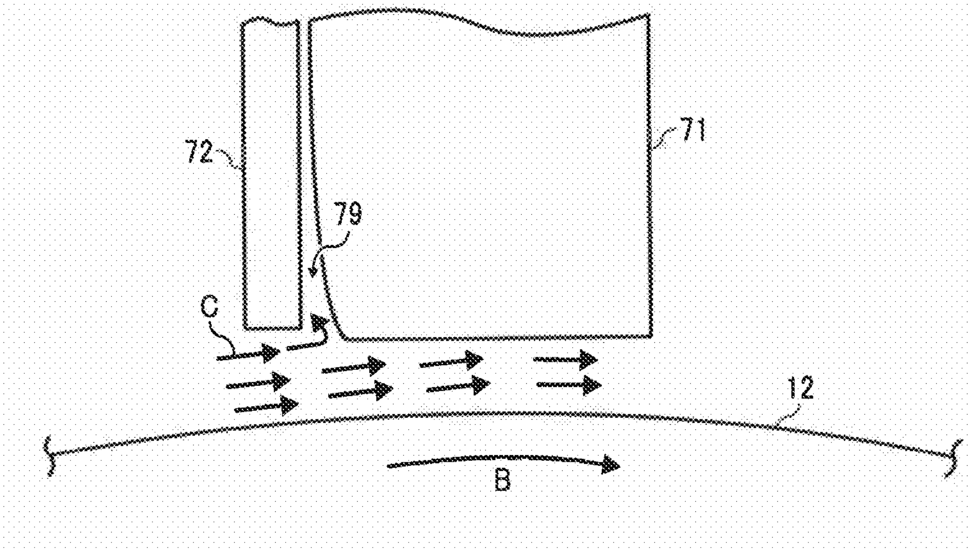
FIG. 13 illustrates a flow of developing agent passing a doctor gap of the doctor blade of FIG. 12.

As illustrated in FIG. 12, the non-magnetic plate 71 has a shear-droop side 71*c* and a burr side 71*b*. If the magnetic plate 72 is fixed to the shear-droop side 71*c* of the non-magnetic plate 71, a groove 79 may exist at the regulating face 70*a* of the doctor blade 70 even if a polishing process is conducted because of shear droop of the non-magnetic plate 71. If the groove 79 exists, some developing agent may be trapped into the groove 79 as shown by an arrow C in FIG. 13 when developing agent is transported on the developing roller 12 rotating in a direction shown by an arrow B in FIG. 13. Toner or other foreign materials may accumulate in the groove 79 over time. If such accumulation becomes great, a magnetic force effect of the magnetic plate 72 on developing agent passing the doctor gap becomes too weak.

If the magnetic force effect of the magnetic plate 72 becomes too weak, chains of developing agent may not be effectively formed in the doctor gap, by which a density of developing agent passing the doctor gap becomes higher, and thereby an amount of developing agent passing the doctor gap may fluctuate and become larger over time. In an exemplary embodiment, toner having a relatively lower melting point or softening point may be used. When such toner passes the doctor gap, toner may be more likely softened by heat, such as frictional heat and heat transmitted from a heat source disposed in an image forming apparatus. If the groove 79 may exist at the regulating face 70*a*, such softened toner may stick and accumulate in the groove 79. Further, other foreign materials may also stick and accumulate in the groove 79.

Figure 14:
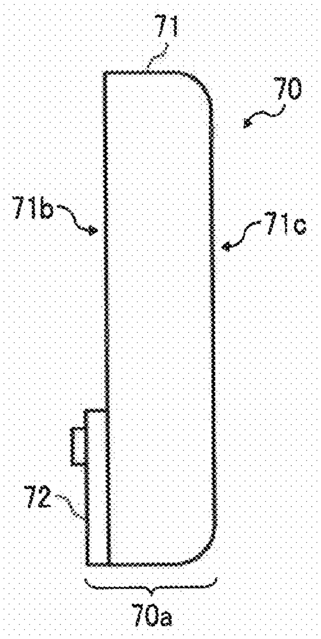
FIG. 14 illustrates another configuration of a doctor blade, in which a magnetic plate is fixed to a burr side of a non-magnetic plate.
Figure 15:
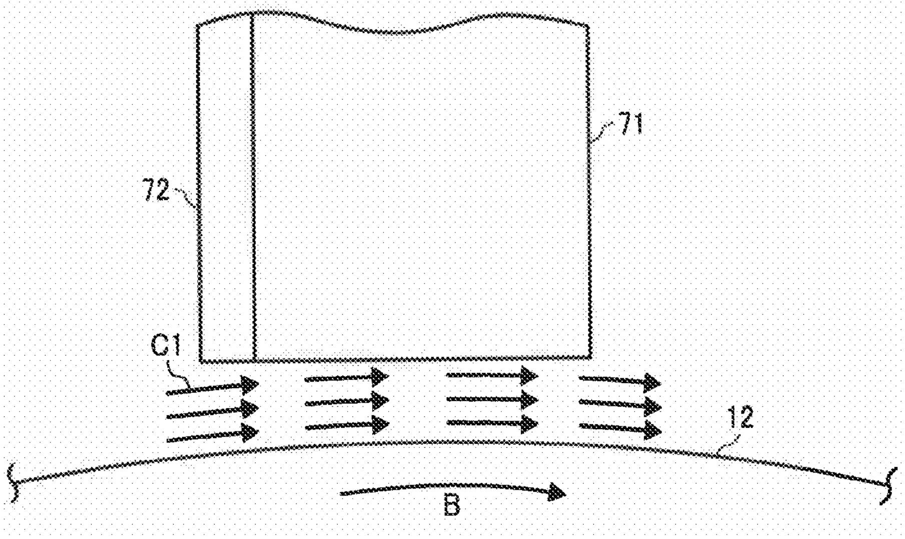
FIG. 15 illustrates a flow of developing agent passing a doctor gap of the doctor blade of FIG. 14.

In view of a possibility of the groove 79, in an exemplary embodiment, the magnetic plate 72 is fixed to the burr side 71*b* of the non-magnetic plate 71 as illustrated in FIG. 14. With such fixing configuration, the groove 79 may not be formed at the regulating face 70*a* of the doctor blade 70, and thereby the regulating face 70*a* can be finished as a flush face. Accordingly, as illustrated in FIG. 15, developing agent transported in a direction shown by an arrow C1 may not be trapped by a portion in the doctor gap when the developing roller 12 rotates in a direction shown by an arrow B in FIG. 15. Therefore, toner in the developing agent and other foreign materials may not stick on the regulating face 70*a*, and thereby an amount of developing agent passing the doctor gap may not fluctuate or become larger over time. Accordingly, images having higher quality can be reliably formed by an image forming apparatus over time.

In an exemplary embodiment, the non-magnetic plate 71 may have the shear-droop side 71*c* because the non-magnetic plate 71 is prepared by a die/punch cut method. However, if the non-magnetic plate 71 can be prepared by a method not causing the shear-droop side 71*c*, the magnetic plate 72 can be fixed to any side faces of the non-magnetic plate 71.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A method of manufacturing a developing agent regulating member for regulating an amount of a developing agent that passes through a space between a regulating face of the developing agent regulating member and a surface of a developing agent carrying member, comprising:

providing a non-magnetic member and a magnetic member;

fixing the non-magnetic member and the magnetic member together by caulking such that an end face of the non-magnetic member and an end face of the magnetic member are substantially aligned with each other, and such that the non-magnetic member and the magnetic member are closely pressed together in order to reduce a gap between the non-magnetic member and the magnetic member; and polishing the end face of the non-magnetic member and the end face of the magnetic member so as to prepare the regulating face of the developing agent regulating member by making the end face of the non-magnetic member and the end face of the magnetic member flush, and polishing further reducing the gap between the non-magnetic member and the magnetic member.

2. The method according to claim 1, wherein the providing the non-magnetic member and the magnetic member includes providing the non-magnetic member and the magnetic member such that the magnetic member includes a first thickness that is smaller than a second thickness of the non-magnetic member, and wherein the fixing the non-magnetic member and the magnetic member together by caulking includes aligning the non-magnetic member and the magnetic member such that the end face of the magnetic member projects slightly beyond the end face of the non-magnetic member.

3. The method according to claim 1, wherein the providing the non-magnetic member and the magnetic member includes providing the non-magnetic member and the magnetic member such that the non-magnetic member includes a first thickness that is smaller than a second thickness of the magnetic member, and wherein the fixing the non-magnetic member and the magnetic member together by caulking includes aligning the non-magnetic member and the magnetic member such that the end face of the non-magnetic member projects slightly beyond the end face of the magnetic member.

4. The method according to claim 1, wherein the providing the non-magnetic member and the magnetic member includes providing the non-magnetic member and the magnetic member such that the non-magnetic member is formed by a punching process that creates a burr on a first face of the non-magnetic member and a shear-droop on a second face of the non-magnetic member, and wherein the fixing the non-magnetic member and the magnetic member together by caulking includes aligning the non-magnetic member and the magnetic member such that the first face of the non-magnetic member formed by the punching process faces and is subsequently attached to the magnetic member.

5. The method according to claim 1, wherein the providing the non-magnetic member and the magnetic member includes providing the non-magnetic member such that the non-magnetic member includes a first substantially flat mating face, a projection that projects beyond the first mating face, and a groove interposed between the projection and the first mating face.

6. The method according to claim 5, wherein the providing the non-magnetic member and the magnetic member includes providing the magnetic member such that the magnetic member includes a second substantially flat mating face and a through hole that extends from the second mating face through the magnetic member, and wherein the fixing the non-magnetic member and the magnetic member together by caulking includes aligning the non-magnetic member and the magnetic member such that first and second mating faces face each other, and such that the projection of the non-magnetic member extends through the through hole of the magnetic member, and deforming the projection of the non-magnetic member so as to secure the non-magnetic member to the magnetic member.

7. The method according to claim 6, wherein the fixing the non-magnetic member and the magnetic member together by caulking includes deforming the projection of the non-magnetic member such that the second mating face is deformed into the groove interposed between the projection and the first mating face.

8. The method according to claim 5, wherein the providing the non-magnetic member and the magnetic member includes providing the non-magnetic member such that the groove interposed between the projection and the first mating face extends around an entire periphery of the projection.

9. The method according to claim 1, wherein the polishing is conducted by using a polishing process for preparing a plane face.

* * * * *